US009682761B2

(12) United States Patent
Okuda (10) Patent No.: US 9,682,761 B2
(45) Date of Patent: Jun. 20, 2017

(54) REMOTE CONTROL DEVICE, AND METHOD AND SYSTEM FOR REMOTELY STEERING SHIP

(71) Applicant: FURUNO ELECTRIC CO., LTD., Nishinomiya, Hyogo (JP)

(72) Inventor: Masato Okuda, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 8 days.

(21) Appl. No.: 14/919,025

(22) Filed: Oct. 21, 2015

(65) Prior Publication Data
US 2016/0121989 A1    May 5, 2016

(30) Foreign Application Priority Data

Oct. 31, 2014    (JP) .................................. 2014-223781

(51) Int. Cl.
*B63H 25/02*    (2006.01)
*B63H 25/04*    (2006.01)
(Continued)

(52) U.S. Cl.
CPC ............. *B63H 25/02* (2013.01); *B63H 25/04* (2013.01); *B63H 25/06* (2013.01); *G01C 21/203* (2013.01);
(Continued)

(58) Field of Classification Search
CPC ........ B63H 25/02; B63H 25/04; B63H 25/06; B63H 2025/02855; B63H 2025/028; G01C 21/203
See application file for complete search history.

(56) References Cited

U.S. PATENT DOCUMENTS 3,952,681 A * 4/1976 Tucker ................. G05D 1/0206
114/144 A
5,797,339 A * 8/1998 Moore ................. G05D 1/0206
114/144 A
(Continued)

FOREIGN PATENT DOCUMENTS

| EP | 1448436 A1 | 8/2004 |
| JP | 2013-079813 A | 5/2013 |
| WO | 03-042036 A1 | 5/2003 |

OTHER PUBLICATIONS

Anonymous, "i-Pilot Remote", retrieved from the Internet, URL: http://www.minnkotamotors.com/Products/i-PILOT-REMOTE/ [retrieved on Apr. 1, 2016], Minn Kota Motors.

*Primary Examiner* — Dale W Hilgendorf
(74) *Attorney, Agent, or Firm* — Global IP Counselors, LLP (57) ABSTRACT

A remote steering system is provided. The remote steering system includes a steering device configured to control a traveling direction of a ship by at least adjusting an angle of a rudder, and a remote control device configured to remotely control the steering device. The remote control device includes an azimuth sensor configured to detect an oriented azimuth of the remote control device, and a controller communication unit configured to transmit, to the steering device, at least one of the oriented azimuth detected by the azimuth sensor and a change amount of the oriented azimuth. The steering device receives the at least one of the oriented azimuth and the change amount from the remote control device, and controls the traveling direction of the ship based on the at least one of the oriented azimuth and the change amount.

15 Claims, 9 Drawing Sheets

(51) Int. Cl.
*B63H 25/06* (2006.01)
*G05D 1/00* (2006.01)
*G05D 1/02* (2006.01)
*G01C 21/20* (2006.01)

(52) U.S. Cl.
CPC ......... *G05D 1/0011* (2013.01); *G05D 1/0016* (2013.01); *G05D 1/0206* (2013.01); *B63H 2025/028* (2013.01)

(56) References Cited

U.S. PATENT DOCUMENTS

| | | | |
|---|---|---|---|
| 8,882,555 B2* | 11/2014 | Mulligan | B63B 35/00 440/40 |
| 2005/0200325 A1 | 9/2005 | Kim et al. | |
| 2006/0063137 A1* | 3/2006 | Robbins | G05B 17/02 434/61 |
| 2006/0206244 A1* | 9/2006 | Arvidsson | G05D 1/0016 701/2 |
| 2012/0040758 A1* | 2/2012 | Hovseth | A63F 13/245 463/37 |
| 2015/0089427 A1* | 3/2015 | Akuzawa | B63H 20/12 701/21 |
| 2016/0096610 A1* | 4/2016 | Suzuki | G05D 1/0206 701/21 |

* cited by examiner

REMOTE CONTROL DEVICE, AND METHOD AND SYSTEM FOR REMOTELY STEERING SHIP

CROSS-REFERENCE TO RELATED APPLICATION(S)

This application claims priority under 35 U.S.C. §119 to Japanese Patent Application No. 2014-223781, which was filed on Oct. 31, 2014, the entire disclosure of which is hereby incorporated by reference.

TECHNICAL FIELD

This disclosure generally relates to a remote steering system, which remotely controls a ship.

BACKGROUND OF THE INVENTION

Conventionally, autopilot techniques to keep a specified course are known. JP2013-079813A discloses a configuration in which autopilot is performed for a ship.

The display device of JP2013-079813A (a touch panel device), upon a predetermined operation thereon to specify a course, outputs the course to an autopilot device. The autopilot device controls a rudder to keep an azimuth of the specified course. Since the display device is connected with a fish finder, it can also display an underwater detection image which is a detection result of the fish finder. The display device, upon a predetermined operation thereon to specify a school of fish in the underwater detection image, instructs the autopilot device to control the ship to travel toward a position where the specified school of fish exists.

Meanwhile, the display device such as the one in JP2013-079813A is fixed to a position in a location where the ship is steered (e.g., the bridge, the command room of the ship). Therefore, the user needs to stay in front of the display device all the time, otherwise he/she cannot specify a course for the autopilot. Since the user may take a break, go fishing, etc., at a different location, he/she needs to move to the front of the display device to change the course for the autopilot every time. Therefore, it is inconvenient for the user and it is also difficult to specify the course quickly.

Moreover, the user generally confirms the situation in the vicinity of the ship concerned visually in addition to by using a detection device, such as a radar apparatus. The user may specify the course for the autopilot based on the visually confirmed information. In such a case, in order to specify the course by using the display device, the correspondence between an actual azimuth and an azimuth on the display device needs to be grasped, and it is difficult to smoothly specify a desired course.

Note that, not only when specifying the course for the autopilot, but also when turning the ship to a desired azimuth (the course is not kept after the ship is turned), similar issues arise.

SUMMARY OF THE INVENTION

The purpose of this disclosure relates to providing a remote control device, which allows to instinctively specify a traveling direction of a ship.

According to one aspect of the present disclosure, a remote steering system is provided. The remote steering system includes a steering device configured to control a traveling direction of a ship by at least adjusting an angle of a rudder, and a remote control device configured to remotely control the steering device. The remote control device includes an azimuth sensor configured to detect an oriented azimuth of the remote control device, and a controller communication unit configured to transmit, to the steering device, at least one of the oriented azimuth detected by the azimuth sensor and a change amount of the oriented azimuth. The steering device receives the at least one of the oriented azimuth and the change amount from the remote control device, and controls the traveling direction of the ship based on the at least one of the oriented azimuth and the change amount.

Thus, the traveling direction of the ship can be controlled by simply specifying a desired azimuth or the change amount by using the remote control device. Therefore, in a case where the traveling direction is specified based on visually confirmed information, the traveling direction of the ship can be instinctively specified. Further, the traveling direction of the ship can be specified at a distant position from the steering device.

The steering device preferably has an autopilot function to keep a specified course, and determines a course for the autopilot based on the at least one of the oriented azimuth and the change amount received from the remote control device.

Thus, the course of the ship for the autopilot can be instinctively specified.

The steering device preferably controls the traveling direction of the ship based on the change amount received from the remote control device.

Thus, the traveling direction of the ship can be specified based on the change amount instinctively specified.

The remote steering system preferably has the following configuration. The remote control device transmits, to the steering device, the change amount of the oriented azimuth from a heading of the ship, and the steering device controls the traveling direction of the ship based on the change amount received from the remote control device.

Thus, the ship can be veered by the change amount of the oriented azimuth, and therefore, an instinctive operation can be achieved.

The remote steering system preferably has the following configuration. The controller communication unit transmits, as a specified oriented-azimuth, the oriented azimuth at which an oriented azimuth specifying operation is performed, the oriented azimuth specifying operation performed to specify the azimuth to be transmitted to the steering device. The steering device controls the traveling direction of the ship to the specified oriented-azimuth.

Thus, the user can specify the traveling direction of the ship after confirming that the remote control device is pointed at a desired azimuth.

The remote steering system preferably has the following configuration. The remote control device includes a display unit configured to display information. At least while the oriented azimuth specifying operation is awaited, the display unit displays at least one of a value indicating the oriented azimuth, information associated with the oriented azimuth, and information associated with a position in the oriented azimuth.

Thus, by displaying the value indicating the oriented azimuth, the traveling direction of the ship can be accurately specified. Further, by displaying the information (e.g., a reference mark in navigation and a port) associated with the oriented azimuth, etc., a position of the reference mark for determining the traveling direction can instinctively and accurately be grasped.

A specified oriented-azimuth is preferably determined based on a reference azimuth specifying operation in which a reference azimuth is specified and a change amount specifying operation in which the change amount of the oriented azimuth from the reference azimuth is specified. The steering device preferably veers the ship based on the specified oriented-azimuth.

Thus, in a case where a destination is specified by using the change amount of the azimuth from one of a target object and the reference mark, the traveling direction of the ship can be easily and instinctively specified.

The remote steering system preferably has the following configuration. The remote control device includes a display unit configured to display information. At least while the change amount specifying operation is awaited, the display unit displays the change amount of the oriented azimuth from the reference azimuth.

Thus, in a case where the traveling direction is specified by using the change amount of the azimuth from the reference azimuth, the traveling direction can be accurately specified.

The remote control device preferably has a long shape and the oriented azimuth is preferably an azimuth pointed by one end of the remote control device in a longitudinal direction thereof.

Thus, the pointing azimuth of the remote control device is easily grasped. Therefore, the course of the ship can accurately be specified.

The remote control device and the steering device are preferably connected to a single local area network.

Thus, compared to a configuration for a signal communication with, for example, infrared rays, the communication reliability can be improved.

The remote control device is preferably wirelessly connected to a local area network.

Thus, the traveling direction of the ship can be specified from a comparatively distance position from a steering device According to another aspect of the present disclosure, a remote control device is provided. The remote control device includes an azimuth sensor configured to detect an oriented azimuth of the remote control device, and a communicator (34) configured to transmit at least one of the oriented azimuth detected by the azimuth sensor and a change amount of the oriented azimuth, to a steering device configured to control a traveling direction of a ship by at least adjusting an angle of a rudder.

Thus, the traveling direction of the ship can be controlled by simply pointing the remote control device to a desired azimuth. Therefore, in a case where the traveling direction is specified based on visually confirmed information, the traveling direction of the ship can be instinctively specified. Further, the traveling direction of the ship can be specified at a distant position from the steering device.

According to still another aspect of the present disclosure, a method of remotely steering a ship is provided. The method includes detecting an oriented azimuth of a remote control device, transmitting at least one of the detected oriented azimuth and a change amount of the oriented azimuth, from the remote control device to a steering device that is remotely controlled by the remote control device, receiving the at least one of the oriented azimuth and the change amount with the steering device, and controlling a traveling direction of the ship based on the at least one of the oriented azimuth and the change amount received.

Thus, the traveling direction of the ship can be controlled by simply pointing the remote control device to a desired azimuth. Therefore, in a case where the traveling direction is specified based on visually confirmed information, the traveling direction of the ship can be instinctively specified. Further, the traveling direction of the ship can be specified at a distant position from the steering device.

BRIEF DESCRIPTION OF THE DRAWING(S)

The present disclosure is illustrated by way of example and not by way of limitation in the figures of the accompanying drawings, in which the like reference numerals indicate like elements and in which.

DETAILED DESCRIPTION

Next, one embodiment of this disclosure is described with reference to the appended drawings.

A ship instrument network system 1 includes a plurality of ship instruments connected to a ship network 10 of a ship (hereinafter, referred to as "the own ship"). The ship network 10 is a network for ship instruments of the single ship to communicate with each other, and is not a network for different ships to communicate with each other. The ship instruments of the single ship exchange information detected thereby, etc., via the ship network 10. The ship network 10 is a LAN (Local Area Network). Specifically, any one of Ethernet (registered trademark), a CAN (Controller Area Network), and an NMEA (National Marine Electronics Association) may be adopted.

Figure 1:
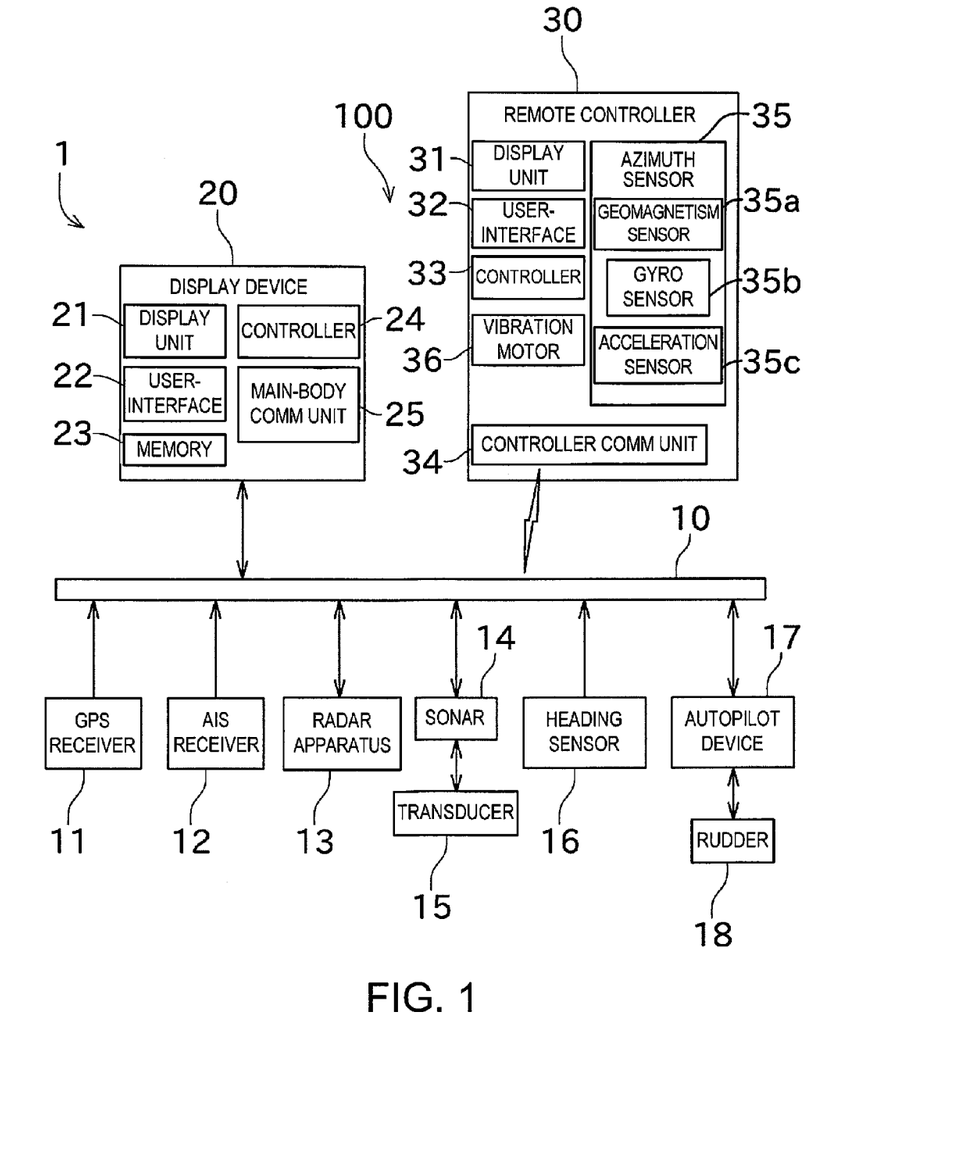
FIG. 1 is a block diagram of a ship instrument network system including a remote steering system.

As illustrated in FIG. 1, the ship instrument network system 1 of this embodiment includes a GPS receiver 11, an AIS receiver 12, a radar apparatus 13, a sonar 14, a heading sensor 16, an autopilot device (steering device) 17, a display device 20, and a remote controller (remote control device) 30.

The GPS receiver 11 receives positioning signals from GPS satellites (GNSS satellites) via a GPS antenna (not illustrated). The GPS receiver 11 obtains a position of the own ship (specifically, a position of the GPS antenna, a terrestrial-reference absolute position of the own ship) based on the positioning signals and transmits the obtained position to the display device 20.

The AIS receiver 12 receives an AIS signal transmitted from another ship (other ship). An AIS (Universal Shipborne Automatic Identification System) is a system that is mounted on a ship concerned (here, the other ship) and transmits therearound positional information, navigational information, etc., of the ship concerned via a wireless communication. The AIS receiver 12 receives the AIS signal transmitted from the other ship and analyzes it to acquire information of the other ship, such as its absolute position and destination (AIS information). The AIS receiver 12 transmits the acquired AIS information to the display device 20. Since the AIS information includes the absolute position of the other ship, by comparing it with the absolute position of the own ship, an azimuth and a distance at which the other ship exists can be calculated. Note that, the AIS signal may be analyzed by the display device 20.

The radar apparatus 13 transmits an electromagnetic wave and receives a reflection wave caused by the electromagnetic wave reflected on a target object. The radar apparatus 13 performs suitable signal processing on the reflection wave and then transmits the processed reflection wave to the display device 20. The display device 20 displays a radar image based on information retrieved from the reflection wave received from the radar apparatus 13 (the image at the top right section of the display device 20 in FIG. 2).

Specifically, the radar apparatus 13 obtains a distance to the target object based on a period of time from the transmission of the electromagnetic wave until the reception of the reflection wave. Further, the radar apparatus 13 obtains the azimuth at which the target object exists, based on the direction to which the electromagnetic wave is transmitted. Note that, the radar image may be created by the display device 20 based on the reflection wave. Moreover, an echo with at least a predetermined intensity may be extracted from the reflection wave by the radar apparatus 13, a position corresponding to the echo and the intensity of the echo may be transmitted to the display device 20, and the display device 20 may display the radar image based on the detection result.

Also, the radar apparatus 13 of this embodiment may vary a property of the electromagnetic wave depending on the transmission azimuth. Specifically, the intensity (power), frequency, pulse width, etc., of the electromagnetic wave may be changed. Further, the radar apparatus 13 may also not transmit the electromagnetic wave only at a predetermined azimuth or change a transmission interval of the electromagnetic wave at a predetermined azimuth.

The sonar 14 transmits an ultrasonic wave underwater from a transducer 15 which is attached at a bottom of the own ship, and receives a reflection wave caused by the ultrasonic wave reflected on one of a school of fish and a waterbed. The sonar 14 performs suitable signal processing on the reflection wave and then transmits the processed reflection wave to the display device 20. The display device 20 displays an underwater detection image based on information retrieved from the reflection wave received from the sonar 14 (the image at the bottom right section of the display device 20 in FIG. 2).

Specifically, the sonar 14 obtains a distance to the one of the school of fish and the waterbed and an azimuth thereof based on a period of time from the transmission of the ultrasonic wave until the reception of the reflection wave and the direction to which the ultrasonic wave is transmitted, similar to the radar apparatus 13. Further, the sonar 14 may measure a fish body length by using the known split-beam method or dual-beam method. Note that, at least part of the processing described above may be performed by the display device 20.

Moreover, the sonar 14 may be one of a search light sonar and a scanning sonar. A search light sonar performs a detection in the vicinity thereof by transmitting an ultrasonic wave that has a detection width range corresponding to a few degrees in azimuth, while changing its transmission azimuth gradually. A scanning sonar performs a detection in the vicinity thereof by simultaneously transmitting ultrasonic waves over the entire or half of entire circumference of a ship concerned. An elevation/depression angle (angle between the transmission direction and the water surface, tilt) of the sonar 14 is changeable. Further, in the case where the sonar 14 is the search light sonar, an intensity or a frequency of the ultrasonic wave to be transmitted at a predetermined azimuth may be changed, the ultrasonic wave may be transmitted only at a predetermined azimuth, etc.

The heading sensor 16 detects a heading of the own ship (direction in which a bow of the own ship is oriented) as a terrestrial-reference absolute azimuth. The heading sensor 16 is any one of a magnetic azimuth sensor, a GPS compass and a gyrocompass, for example.

The autopilot device 17 controls a rudder 18 to keep a specified course. Specifically, the autopilot device 17 calculates a variation angle, that is a difference between the heading acquired from the heading sensor 16 and the specified course, and adjusts an angle of the rudder 18 to control a traveling direction of the own ship so that the variation angle becomes close to zero. Note that, the course may be specified by the autopilot device 17, the display device 20, the remote controller 30 or the like.

Figure 2:
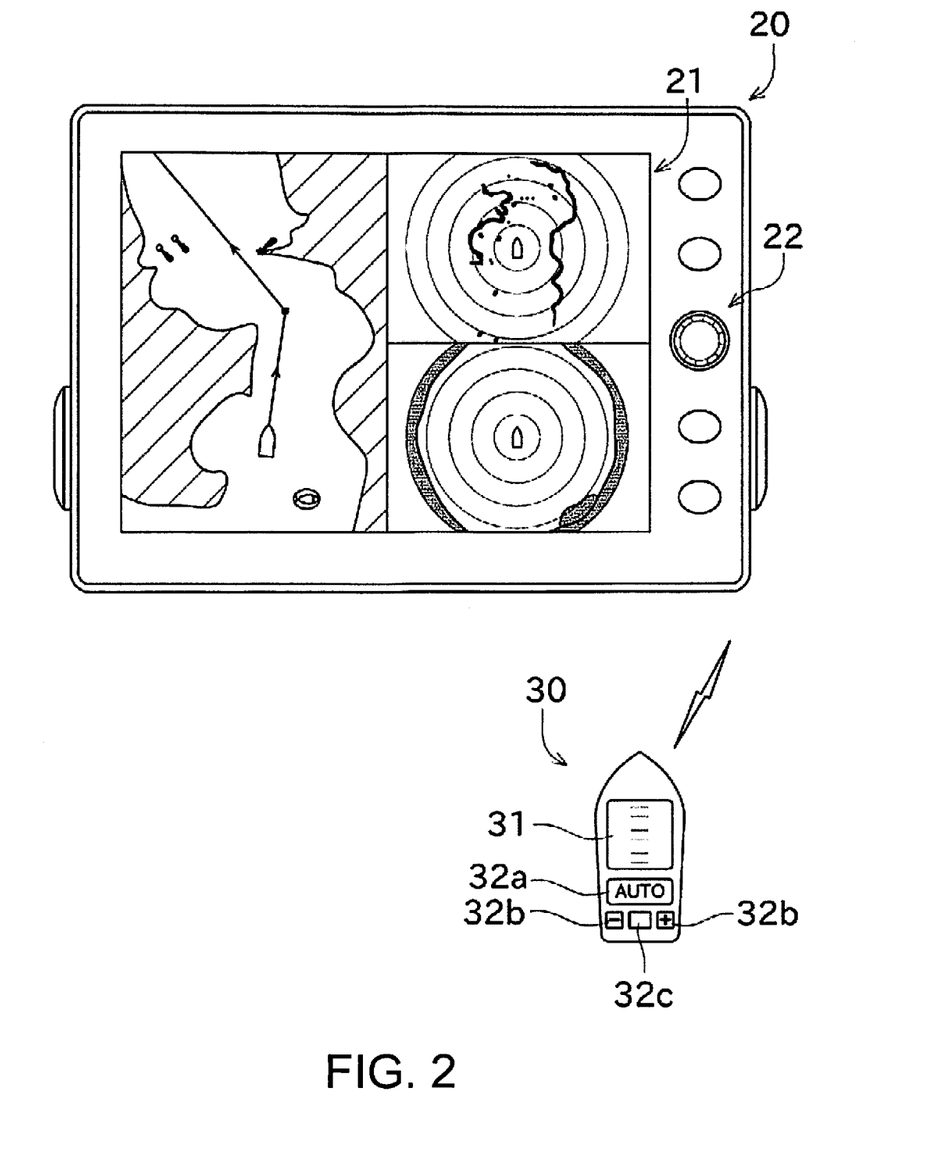
FIG. 2 is an elevational view of a display device and a remote controller.

As illustrated in FIG. 2, the display device 20 creates images (sensor images) based on the information detected by the other ship instruments (sensors), displays the created images, and performs processing according to operation performed by a user. Specifically, the display device 20 includes a display unit 21, a user-interface 22, a memory 23, a controller 24, and a main-body communication unit 25.

The display unit 21 is configured by, for example, a liquid crystal display. The display unit 21 displays the sensor images, a setting screen, etc.

The user-interface 22 is configured by a rotational key rotatable in a clockwise/counterclockwise direction, a menu key configured to call for a menu screen, a cursor key, etc. Note that, in the display device 20 of this embodiment, the user-interface is provided to the display device 20 itself; however, other kinds of user-interface, such as a mouse and/or a keyboard, may be externally attachable, and the user-interface may detect touch operation by the user.

The memory 23 stores contents of a program which is executed by the controller 24, nautical chart information, a location specified by the user, etc. The nautical chart information includes positions of a lighthouse, a channel buoy, a port, a fish bed, a navigation-prohibited area, a shallow bottom area, and a frozen area, and water depths at these positions. The location specified by the user is at least one of a destination, and stopover(s) before reaching the destination (waypoint(s)). Since the information included in the nautical chart information and the location specified by the user are associated with absolute positions thereof, by comparing them with the absolute position of the own ship, azimuths and distances to which these information and location correspond can be calculated.

The controller 24 creates the radar image, the underwater detection image, a chart image (an image with the position of the own ship on a nautical chart, the image at the left section of the display device 20 in FIG. 2), etc., based on the stored contents in the memory 23 and the information received from the other ship instruments and displays them on the display unit 21.

The main-body communication unit 25 is an interface communicable with a LAN, and is communicable with the ship instruments connected to the ship network 10.

The remote controller 30 is connected with the ship instruments, such as the display device 20, by a wireless LAN. The remote controller 30 transmits a predetermined instruction to the autopilot device 17 via the display device 20 based on a pointing azimuth of the remote controller 30, receives information from the display device 20, and displays the information. The remote controller 30 of this embodiment is a long flat-plate member formed into a boat shape, and has a size which allows the user to control with one hand. Hereinafter, one side of the remote controller 30 seen in its thickness direction is a front face of the remote controller 30, a bow-side end of the boat shape (one end in a longitudinal direction) is a tip of the remote controller 30, and an opposite side end of the boat shape (an end on the side gripped by the user) is a base end.

As illustrated in FIGS. 1 and 2, the remote controller 30 includes a display unit 31, a user-interface 32, a controller 33, a controller communication unit (communicator) 34, an azimuth sensor 35, and a vibration motor 36.

The display unit 31 is configured by, for example, a liquid crystal display disposed at the front face of the remote controller 30. The display unit 31 displays the pointing azimuth of the remote controller 30, the information received from the display device 20, setting information, etc.

As illustrated in FIG. 2, the user-interface 32 includes an autopilot switching key 32a, a pair of course adjusting keys 32b, and an enter key 32c. The autopilot switching key 32a switches the autopilot ON/OFF. The autopilot switching key 32a with letters "AUTO" is lighted up when the autopilot is ON, while the light is turned off when the autopilot is OFF. The course adjusting keys 32b are keys for adjusting the course during the autopilot. The enter key 32c is a key for specifying the adjusted course during the autopilot. Note that, the remote controller 30 displays the menu screen by holding down one of these keys for a while or other key operation. The course adjusting keys 32b are also used to, for example, move a cursor when selecting a predetermined menu item, and the enter key 32c is used to specify the selection.

The controller 33 controls the respective parts of the remote controller 30. Specifically, the controller 33, according to the operation by the user, generates a signal to be transmitted to the display device 20, converts a signal received from the display device 20 to display it on the display unit 31.

The controller communication unit 34 is configured by, for example, an antenna communicable by a wireless LAN. The controller communication unit 34 is communicable with the display device 20 disposed outside the remote controller 30, via a wireless LAN router (not illustrated) of the ship network 10, for example.

The azimuth sensor 35 detects the pointing direction (pointing azimuth, oriented azimuth) of the remote controller 30. The azimuth sensor 35 of this embodiment includes a geomagnetism sensor 35a, a gyro sensor 35b, and an acceleration sensor 35c. The geomagnetism sensor 35a is an electronic compass using geomagnetism, and detects, as a terrestrial-reference absolute azimuth, an azimuth at which the tip of the remote controller 30 points (i.e., the pointing direction of the remote controller 30 in a horizontal plane).

The gyro sensor 35b detects a posture of the remote controller 30 (e.g., the pointing direction of the remote controller 30 in a plane perpendicular to the horizontal plane). The acceleration sensor 35c detects a change of the pointing direction of the remote controller 30. Further, the azimuth sensor 35 can detect whether operation of waving the remote controller 30 is performed by the user, based on the detection results of the gyro sensor 35b and the acceleration sensor 35c, etc.

Note that, the configuration of the azimuth sensor 35 described in this embodiment is merely an example, and sensors other than those described above may be used. For example, a GPS compass may be used instead of the geomagnetism sensor 35a. Also, the azimuth sensor 35 may be configured only by a sensor that detects an azimuth. Note that, the processing of calculating the pointing direction of the remote controller 30 by combining the detection results of the respective sensors may be performed by either one of the remote controller 30 and the display device 20.

The vibration motor 36, upon receiving a predetermined signal from the controller 33, provides a notification to the user by causing vibration. Note that, the timing for the vibration motor 36 to provide the notification is described later.

Next, processing of changing the traveling direction of the own ship, especially specifying the course for the autopilot, by using the remote controller 30 is described. Hereinafter, a system including the remote controller 30, the display device 20, and the autopilot device 17 is referred to as a remote steering system 100. The remote steering system 100 can specify the course for the autopilot based on an oriented azimuth (the pointing azimuth of the remote controller 30).

Moreover, the remote steering system 100 of this embodiment can activate, as a method of specifying the course, either one of a direct specifying mode in which the course is directly specified, and a change amount specifying mode in which the course is specified by using an azimuth change amount from a reference azimuth. Note that, without providing such modes for specifying the course, the azimuth currently pointed by the remote controller 30 may be specified as the course by performing a predetermined operation on the remote controller 30.

First, the method of specifying the course in the direct specifying mode is described with reference to FIGS. 3 to 5.

First, the user instructs the remote controller 30 to activate the direct specifying mode by, for example, selecting a predetermined menu item on the menu screen of the remote controller 30. Then, on the display unit 31 of the remote controller 30, as illustrated in the remote controller 30 in FIG. 4, the heading, the specified course for the autopilot, and the oriented azimuth (the pointing azimuth of the remote controller 30) are displayed in this order from the top. These are displayed as reference information for the user to specify the course.

Figure 3:
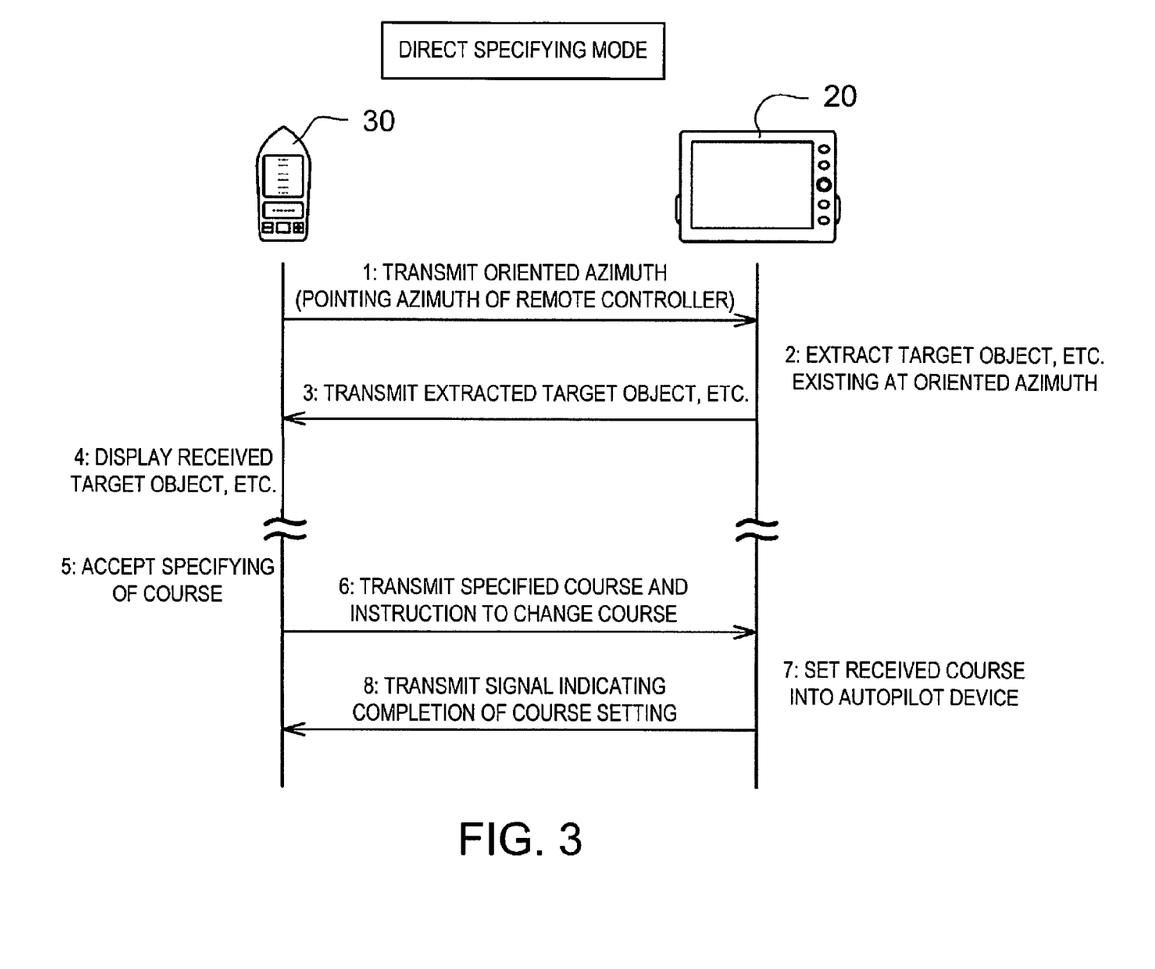
FIG. 3 is a view illustrating a flow of processing performed in a direct specifying mode in which a course for autopilot is directly specified.
Figure 4:
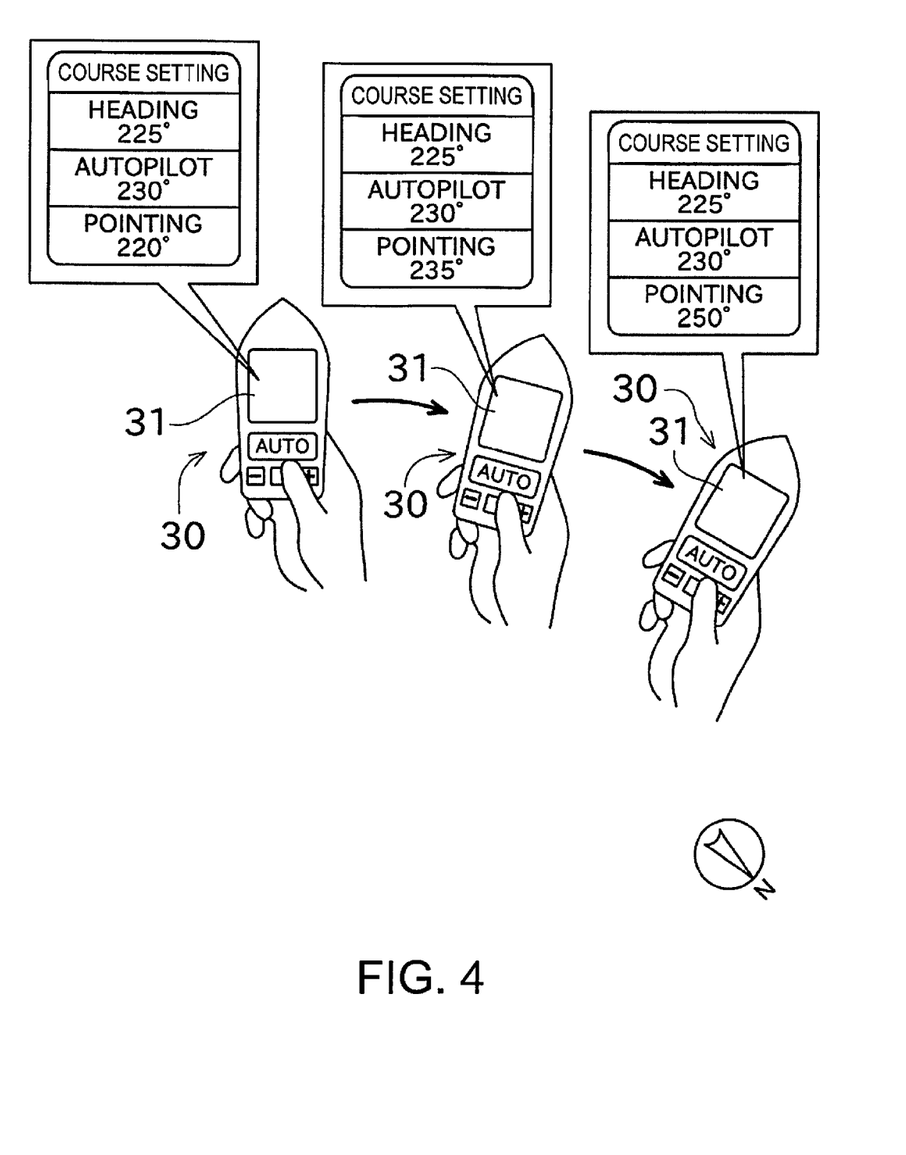
FIG. 4 is a view illustrating displayed contents when an oriented azimuth of the remote controller is changed in the direct specifying mode.

Moreover, in the direct specifying mode, the remote controller 30 transmits, to the display device 20, the oriented azimuth which is the detection result of the azimuth sensor 35 (Sequence No. 1 in FIG. 3).

The display device 20, upon receiving the oriented azimuth, extracts information related to the oriented azimuth, from the information received from the AIS receiver 12, the radar apparatus 13, and the sonar 14, and the information stored in the memory 23 (Sequence No. 2). Specifically, the display device 20 selects one of information associated with the oriented azimuth and neighboring azimuths thereof and information associated with positions in these azimuths. Then, the display device 20 further extracts information which is considered to be highly important, from the selected information. The importance is determined based on, for example, a distance of the information from the own ship, whether, in a case where the information indicates the other ship, the information is associated with a position forward of the own ship, and, in a case where the information indicates the school of fish, a scale of the school of fish, a fish body length, etc. The display device 20 transmits, to the remote controller 30, contents, the distance, and other information regarding the extracted target objects, etc. (Sequence No. 3).

The remote controller 30, upon receiving the information regarding the target object and/or the like from the display device 20, activates the vibration motor 36 to cause vibration and displays the information regarding the target object and/or the like received from the display device 20 on the display unit 31 (Sequence No. 4). By causing the vibration, the user can grasp that the target object and/or the like exists at the oriented azimuth, without looking at the display unit 31. Note that, when the target object and the like to be displayed do not exist, as illustrated in the remote controller 30 in FIG. 4, the heading, the specified course for the autopilot, and the oriented azimuth are displayed.

In the case where the target object and/or the like is displayed, the school-of-fish information detected by the sonar 14 may be displayed on the display unit 31. Examples of the displayed contents include a type (e.g., Fish) of the information, a distance thereof from the own ship, a water depth at which the school of fish exists and the fish body length, etc. Note that, other than the school of fish, the remote controller 30 may display various kinds of information acquired by the display device 20. Specifically, the other ship information acquired from the AIS receiver 12 or the radar apparatus 13 may be displayed, the displayed contents of which include a size of the other ship, a speed of the other ship, a destination of the other ship, and a possibility of collision with the own ship, etc. Moreover, the remote controller 30 can display various kinds of information included in the nautical chart information, and/or a location specified by the user. Note that, information related to the water depth may be the detection result of the sonar 14, or a value included in the nautical chart information.

The user, by looking at the various kinds of information displayed on the remote controller 30, can specify the course for the autopilot while grasping the situation in the vicinity thereof. Since the processing illustrated in Sequence No. 1 to 4 is performed as needed, when the target object and/or the like exists at the pointing azimuth of the remote controller 30, the target objects and/or the like can be displayed in real time.

Figure 5:
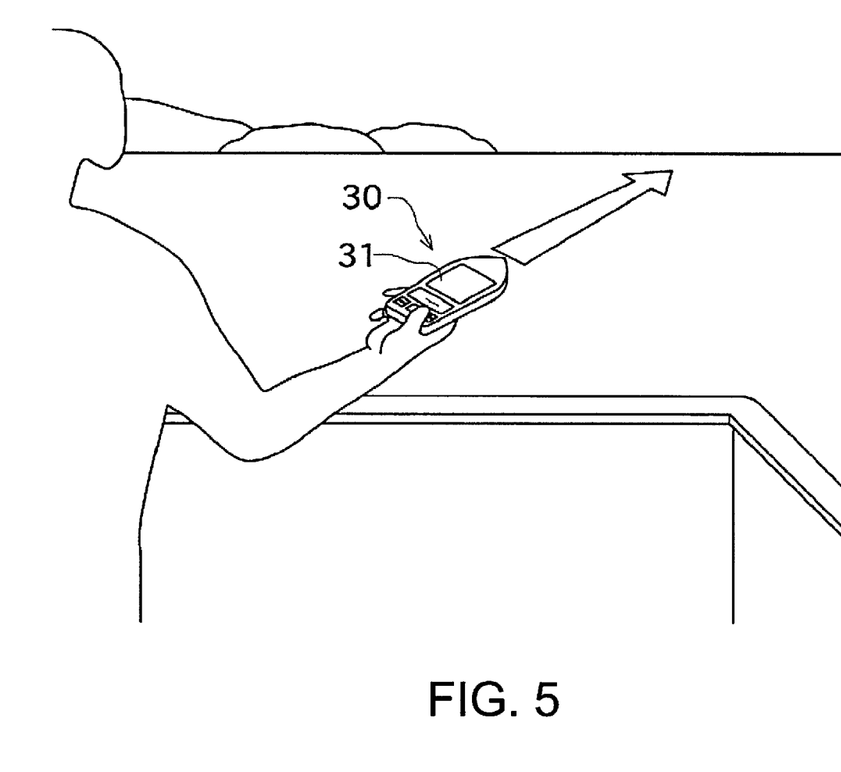
FIG. 5 is a view illustrating a situation where an oriented azimuth specifying operation is performed in the direct specifying mode.

Then, the user, by pressing the enter key 32c in a state where the remote controller 30 is oriented to a desired azimuth, specifies the course for the autopilot (oriented azimuth specifying operation, see FIG. 5). The remote controller 30 accepts the operation (Sequence No. 5) and then transmits, to the display device 20, the specified course (specified oriented-azimuth) and the instruction to change the course for the autopilot to the specified oriented-azimuth (Sequence No. 6).

The display device 20, upon receiving the specified course, sets the course into the autopilot device 17 (Sequence No. 7). Then, the display device 20 transmits, to the remote controller 30, a signal indicating completion of the course setting (Sequence No. 8). Thus, the course setting in the direct specifying mode is completed. Then, the autopilot device 17 controls the rudder 18 so that the course specified by the user corresponds to the traveling direction of the own ship.

Figure 6:
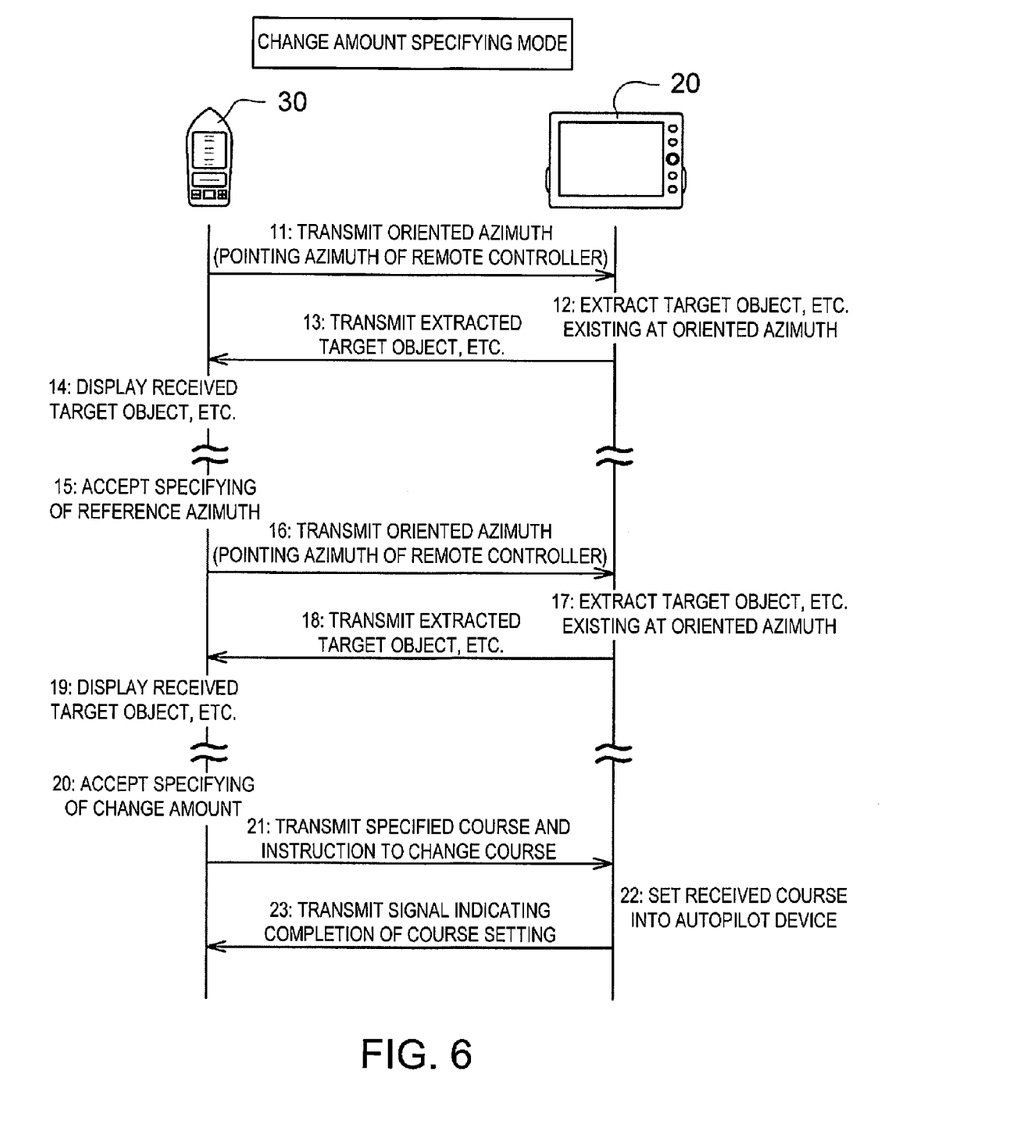
FIG. 6 is a view illustrating a flow of processing performed in a change amount specifying mode in which the course for the autopilot is specified by using a change amount of an azimuth from a reference azimuth.
Figure 7:
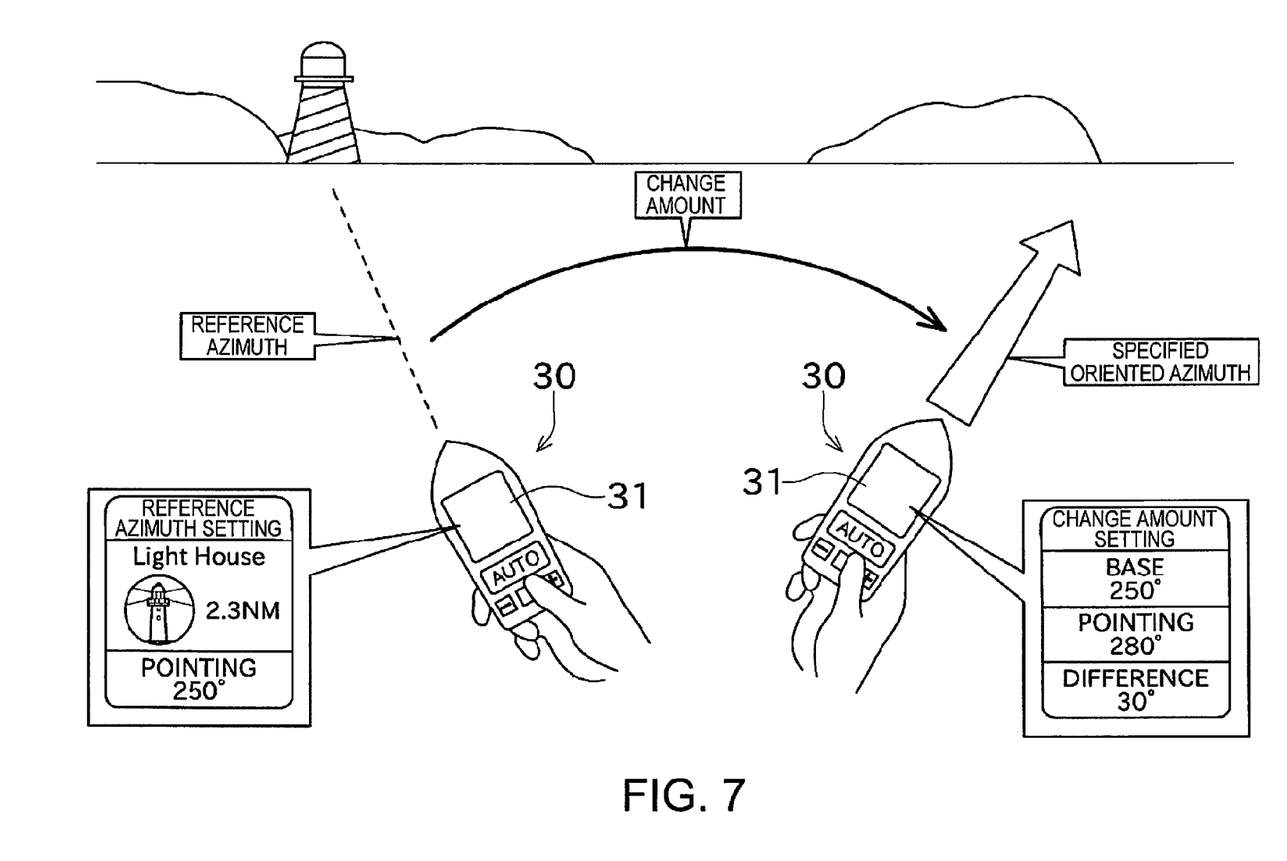
FIG. 7 is a view for describing an operation by a user in the change amount specifying mode.

Next, with reference to FIGS. 6 and 7, a method of specifying the course in the change amount specifying mode is described.

First, the user, similar to the direct specifying mode, performs a predetermined operation on the remote controller 30 to activate the change amount specifying mode. Then, similar to the direct specifying mode, the heading, the course specified for the autopilot, and the oriented azimuth are displayed on the display unit 31 of the remote controller 30 (see FIG. 6).

Then, the remote steering system 100 performs processing of displaying, on the remote controller 30, the target object and/or the like that exists at the oriented azimuth (Sequence No. 11 to 14). The processing is similar to Sequence No. 1 to 4 and, thus, a description thereof is omitted.

The user, by pressing the enter key 32c in the state where the remote controller 30 is oriented to the desired azimuth, specifies the reference azimuth (reference azimuth specifying operation). The remote controller 30 accepts the operation and stores the specified reference azimuth (Sequence No. 15). In the example illustrated in FIG. 7, as illustrated in the remote controller 30 on the left side, processing of specifying a direction in which a light house exists as the reference azimuth is performed. Note that, the user, by performing a predetermined operation, can cancel the specifying of the reference azimuth. The predetermined operation may be waving the remote controller, for example. This operation can be detected by the acceleration sensor 35c as described above.

Next, the user specifies the change amount by changing the azimuth pointed by the remote controller 30 (the oriented azimuth). Here, as illustrated in the remote controller 30 on the right side in FIG. 7, a difference between the reference azimuth and the oriented azimuth is displayed on the remote controller 30. Thus, the user can accurately grasp the change amount of the azimuth from the reference azimuth. Note that, even while the specifying of the change amount is awaited, processing of displaying, on the remote controller 30, the target object and/or the like existing at the oriented azimuth is performed (Sequence No. 16 to 19). The processing is similar to Sequence No. 1 to 4 and, thus, a description thereof is omitted. If the target object and/or the like to be displayed exists, the remote controller 30 displays the target object and/or the like as well as the difference between the oriented azimuth and the reference azimuth, for example. On the other hand, if the target object and the like to be displayed do not exist, the remote controller 30 displays the reference azimuth and the oriented azimuth instead of the target object and the like.

Then, the user, by pressing the enter key 32c in the state where the remote controller 30 is oriented to the desired azimuth, specifies the change amount (change amount specifying operation). The remote controller 30 accepts the operation (Sequence No. 20). In the example illustrated in FIG. 7, the change amount specifying operation is performed in a direction indicated by the remote controller 30 on the right side. The remote controller 30 transmits, to the display device 20, the specified change amount, in other words, the specified course (i.e., the current oriented azimuth, specified oriented-azimuth), and transmits an instruction to change the course for the autopilot to the specified oriented-azimuth (Sequence No. 21).

The display device 20, upon receiving the specified course, sets the course into the autopilot device 17 (Sequence No. 22). Then, the display device 20 transmits, to the remote controller 30, a signal indicating completion of the course setting (Sequence No. 23). Thus, the course setting in the change amount specifying mode is completed. Then, the autopilot device 17 controls the rudder 18 so that the azimuth (course) specified by the user corresponds to the traveling direction of the own ship.

The setting of the course for the autopilot is performed as above. Moreover, even when the autopilot is OFF, the remote controller 30 of this embodiment may be used to turn the own ship. Specifically, by pressing the enter key 32c in a state where the remote controller 30 is oriented to a desired azimuth to which the own ship turns, the rudder 18 is controlled so that the own ship is oriented to the oriented azimuth of the remote controller 30. Note that, even while the specifying of the turning direction is awaited, the target object and/or the like is displayed on the remote controller 30.

Figure 8:
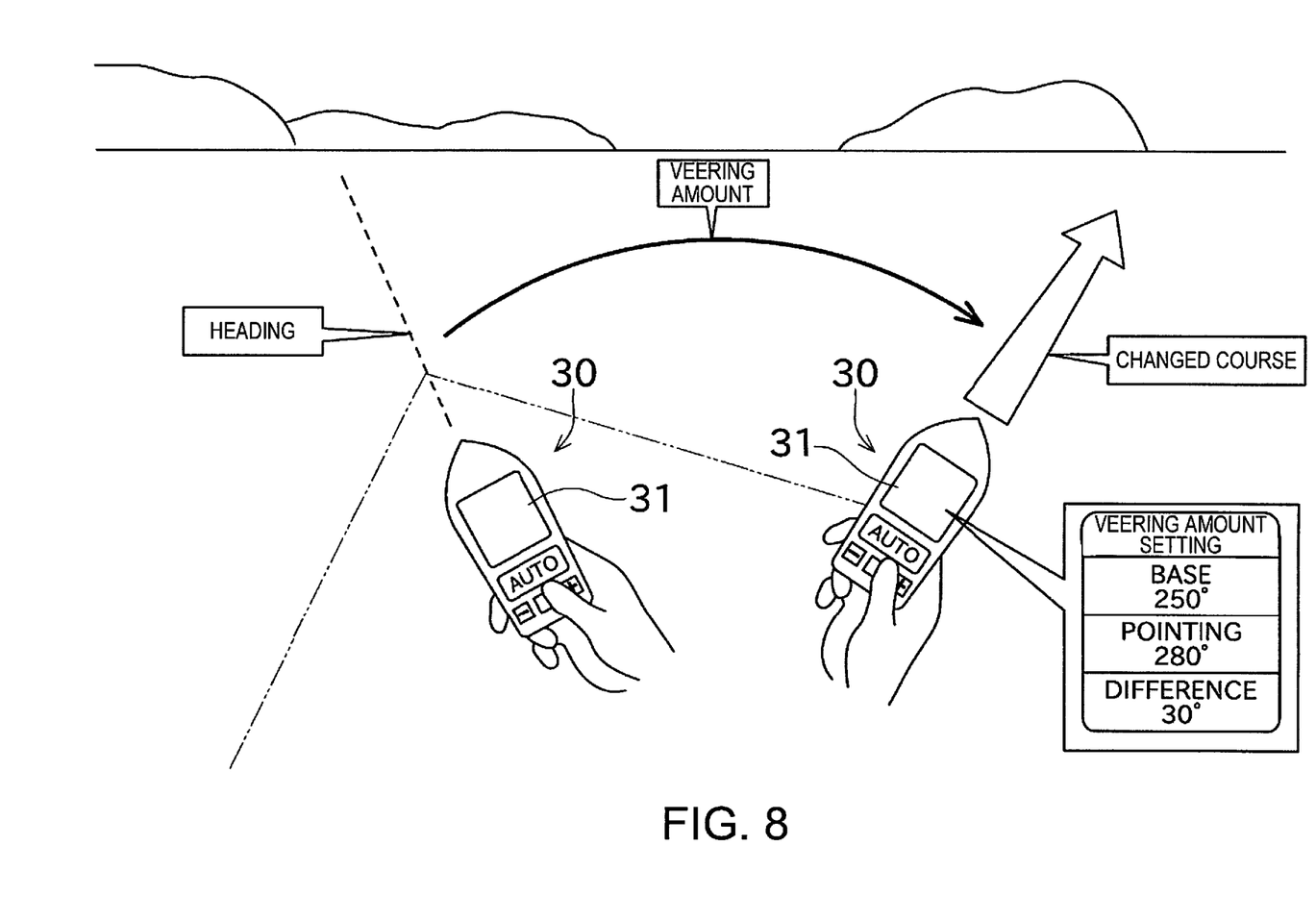
FIG. 8 is a view illustrating a situation where a heading is specified as the reference azimuth in the change amount specifying mode.

Further, in the above description, the azimuth at which the light house exists is specified as the reference azimuth; however, the heading may be specified as the reference azimuth as illustrated in FIG. 8. In the case where the heading is specified as the reference azimuth, similar to the above description, the specified oriented-azimuth may be transmitted to the display device 20, or the change amount of the oriented azimuth from the state where the remote controller 30 is oriented to the heading may be transmitted to the display device 20. Since this change amount corresponds to the change amount of the course (veering amount) set into the autopilot device 17, the own ship can be veered based on this change amount.

Figure 9:
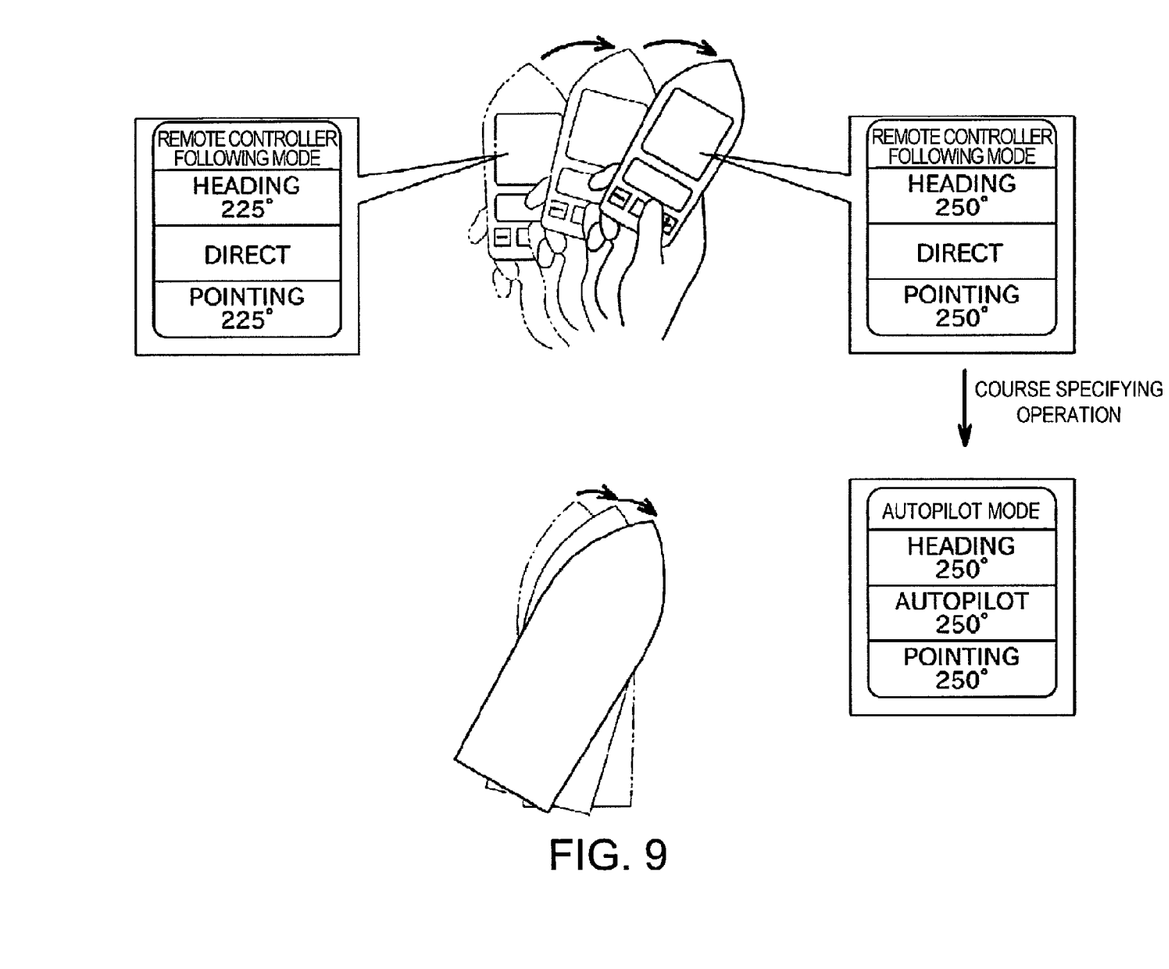
FIG. 9 is a view illustrating a situation where the ship is veered in a remote controller following mode.

In the above description, the own ship is actually veered (the autopilot device 17 controls the rudder 18) after the course for the autopilot or the veering amount of the own ship is specified by controlling the remote controller 30. However, in the remote steering system 100, the own ship may also be veered in real time according to the change of oriented azimuth of the remote controller 30 (the own ship is veered so that the oriented azimuth corresponds to the heading all the time). Such a case is specifically described as follows with reference to FIG. 9. First, the user instructs the remote controller 30 to activate a remote controller following mode by performing a predetermined operation thereon in a state where the remote controller 30 is oriented to the heading. In the remote controller following mode, until a mode canceling operation is performed by the user, the rudder 18 is controlled so that the oriented azimuth of the remote controller 30 corresponds to the heading all the time (see FIG. 9). Here, a turning amount per unit time, etc., may be limited to prevent a steep turn. Moreover, since a time lag occurs from the adjustment of the rudder 18 until the own ship actually veers, the oriented azimuth does not correspond to the heading instantly. Furthermore, in the remote controller following mode, in response to a predetermined course specifying operation, the oriented azimuth of the remote controller 30 at the time of this operation may be specified as the course for the autopilot (see FIG. 9).

As described above, the remote steering system 100 includes the autopilot device 17 and the remote controller 30. The autopilot device 17 at least adjusts the angle of the rudder 18 to control the traveling direction of the own ship. The remote controller 30 remotely controls the autopilot device 17 and includes the azimuth sensor 35 and the controller communication unit 34. The azimuth sensor 35 detects the oriented azimuth of the remote controller 30. The controller communication unit 34 transmits, to the display device 20, at least one of the oriented azimuth detected by the azimuth sensor 35 and the change amount of the oriented azimuth. The autopilot device 17 controls the traveling direction of the own ship based on at least one of the oriented azimuth and the change amount of the oriented azimuth received from the remote controller 30.

Thus, the traveling direction of the own ship can be specified by simply pointing the remote controller 30 at a desired azimuth. Therefore, when specifying the traveling direction based on visually confirmed information, the traveling direction of the own ship can instinctively be specified. Moreover, the traveling direction of the own ship can be specified even at a distant position from the autopilot device 17.

Although the preferred embodiment of this disclosure is described above, the above configuration may be modified as follows.

In the above embodiment, the remote controller 30 outputs the oriented azimuth, etc., to the autopilot device 17 via the display device 20; however, the remote controller 30 may directly output the oriented azimuth, etc., to the autopilot device 17.

The shape of the remote controller 30 is arbitrary, and for example, it may have a stick shape or a rectangular flat plate shape. Further, the remote controller 30 may be connected with one of the display device 20 and the autopilot device 17 by wire. In this case, the remote controller 30 may communicate with one of the display device 20 and the autopilot device 17 without connecting the remote controller 30 to a local area network.

In the above embodiment, the remote controller 30 transmits the oriented azimuth to the display device 20, and receives information regarding the oriented azimuth. Alternatively, the remote controller 30 may store the nautical chart information, etc., and extract information regarding the oriented azimuth. Moreover, the remote controller 30 may store an azimuth at which the nautical chart information, etc., exists, and acquire details of the nautical chart information, etc., at the corresponding azimuth from the display device 20 when a predetermined instruction is performed by the user. Note that, in the case where the remote controller 30 stores at least the azimuth of the nautical chart information, etc., the remote controller 30 may display the azimuth.

The above-described ship instruments connected to the ship network 10 are merely an example, and may suitably be changed. For example, a fish finder configured to transmit ultrasonic waves directly below the own ship may be connected to the ship network 10.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A remote steering system, comprising:
a rudder steering device configured to control a traveling course of a ship by at least adjusting an angle of a rudder; and
a remote control device configured to remotely control the rudder steering device, the remote control device including:
an azimuth sensor configured to detect an oriented azimuth, or a reference azimuth and a change amount from the reference azimuth, indicated by the remote control device; and
a controller communication unit configured to transmit, to the rudder steering device, the oriented azimuth, or the reference azimuth and the change amount from the reference azimuth, and
wherein the rudder steering device receives the oriented azimuth, or the reference azimuth and the change amount from the reference azimuth from the remote control device, and makes a course or a heading of the ship correspond to the oriented azimuth, or an azimuth based on the reference azimuth and the change amount from the reference azimuth of the remote control device.

2. The remote steering system of claim 1, wherein the rudder steering device has an autopilot function to keep a specified course, and determines a course for the autopilot based on the oriented azimuth, or the reference azimuth and the change amount from the reference azimuth, received from the remote control device.

3. The remote steering system of claim 1, wherein the rudder steering device controls the traveling course of the ship based on the change amount from the reference azimuth, received from the remote control device.

4. The remote steering system of claim 3, wherein the remote control device transmits, to the rudder steering device, the change amount from the reference azimuth from a heading of the ship, and
wherein the rudder steering device controls the traveling course of the ship based on the change amount from the reference azimuth, received from the remote control device.

5. The remote steering system of claim 1, wherein the controller communication unit transmits, as a specified oriented-azimuth, the oriented azimuth at which an oriented azimuth specifying operation is performed, the oriented azimuth specifying operation performed to specify the azimuth to be transmitted to the rudder steering device, and
wherein the rudder steering device controls the traveling course of the ship to the specified oriented-azimuth.

6. The remote steering system of claim 5, wherein the remote control device includes a display unit configured to display information, and
wherein at least while the oriented azimuth specifying operation is awaited, the display unit displays at least one of a value indicating the oriented azimuth, information associated with the oriented azimuth, and information associated with a position in the oriented azimuth.

7. The remote steering system of claim 1, wherein a specified oriented-azimuth is determined based on a reference azimuth specifying operation in which a reference azimuth is specified and a change amount specifying operation in which the change amount from the reference azimuth is specified, and
wherein the rudder steering device veers the ship based on the specified oriented-azimuth.

8. The remote steering system of claim 7, wherein the remote control device includes a display unit configured to display information, and
wherein at least while the change amount specifying operation is awaited, the display unit displays the change amount from the reference azimuth.

9. The remote steering system of claim 1, wherein the remote control device and the rudder steering device are connected to a single local area network.

10. A remote control device, comprising:
an azimuth sensor configured to detect an oriented azimuth of the remote control device, or a reference azimuth and a change amount from the reference azimuth by the remote control device, indicated by the remote control device; and
a communicator configured to transmit control instructions including the oriented azimuth, or the reference azimuth and a change amount from the reference azimuth, to a rudder steering device configured to control a traveling course of a ship by at least adjusting an angle of a rudder according to the control instructions.

11. The remote control device of claim 10, wherein the communicator transmits an instruction to change the traveling course of the ship to the rudder steering device, along with the at least one of the oriented azimuth and the change amount.

12. The remote control device of claim 10, further comprising a controller configured to determine one of a specified oriented-azimuth and the change amount from the reference azimuth based on a reference azimuth specifying operation in which a reference azimuth is specified and a change amount specifying operation in which the change amount from the reference azimuth is specified,
wherein the communicator transmits an instruction to the rudder steering device to veer the ship based on the one of the specified oriented-azimuth and the change amount.

13. A method of remotely steering a ship, comprising:
detecting an oriented azimuth of a remote control device;
transmitting the detected oriented azimuth, or a reference azimuth and a change amount from the reference azimuth, indicated by the remote control device, to a rudder steering device that is remotely controlled by the remote control device;
receiving the oriented azimuth, or the reference azimuth and the change amount from the reference azimuth, with the rudder steering device; and
controlling a traveling course of the ship corresponding to the oriented azimuth, or an azimuth based on the reference azimuth and the change amount from the reference azimuth of the remote control device, and received by the rudder steering device.

14. The method of remotely steering the ship of claim 13, wherein the transmitting the detected oriented azimuth, or the reference azimuth and the change amount from the reference azimuth, includes transmitting an instruction to change the traveling course of the ship, along with the oriented azimuth, or the reference azimuth and the change amount.

15. The method of remotely steering the ship of claim 13, wherein the transmitting the detected oriented azimuth, or the reference azimuth and the change amount from the reference azimuth, includes determining one of a specified oriented-azimuth and the change amount based on a reference azimuth specifying operation in which a reference azimuth is specified and a change amount specifying operation in which the change amount from the reference azimuth is specified, and
   wherein the controlling the traveling course includes veering the ship based on the one of the specified oriented-azimuth and the change amount.

* * * * *